United States Patent
Takarabe (10) Patent No.: US 7,280,834 B2
(45) Date of Patent: Oct. 9, 2007

(54) RADIO COMMUNICATION SYSTEM

(75) Inventor: Shohei Takarabe, Sagamihara (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 11/207,088

(22) Filed: Aug. 19, 2005

(65) Prior Publication Data

US 2006/0040671 A1 Feb. 23, 2006

(30) Foreign Application Priority Data

Aug. 20, 2004 (JP) ............... 2004-240816

(51) Int. Cl.
*H04Q 7/20* (2006.01)
(52) U.S. Cl. ............ 455/450; 455/453; 455/452.2; 455/447; 379/46; 379/49; 370/422; 370/441; 370/450
(58) Field of Classification Search ........ 455/450, 455/453, 452.2, 455, 422.1; 379/48, 49; 370/422, 441, 450
See application file for complete search history.

(56) References Cited

U.S. PATENT DOCUMENTS 4,106,092 A * 8/1978 Millers, II ............ 710/64
5,157,709 A * 10/1992 Ohteru ................. 455/465
6,542,747 B1 * 4/2003 Syukri ................. 455/450

FOREIGN PATENT DOCUMENTS

| JP | 04-150116 | 5/1992 |
|----|-----------|--------|
| JP | 07-154843 | 6/1995 |
| JP | 8-33023 | 2/1996 |
| JP | 8-256370 | 10/1996 |
| JP | 09-037331 | 2/1997 |
| JP | 10-322770 | 12/1998 |
| JP | 11-262044 | 9/1999 |
| JP | 2001-275152 | 10/2001 |
| JP | 2002-300168 | 10/2002 |

* cited by examiner

*Primary Examiner*—Joseph Feild
*Assistant Examiner*—Khai Nguyen
(74) *Attorney, Agent, or Firm*—Mattingly, Stanger, Malur & Brundidge, P.C.

(57) ABSTRACT

A radio communication system has a base station(s), a plurality of mobile stations, and a line controller connected to the base station. The line controller has a first memory for keeping track of each communication channel for each base station as to whether the communication channel is occupied or idle. The base station has a second memory for storing an idle communication channel stored in the first memory as a reserved channel. The base station is responsive to a connection request issued from an arbitrary calling mobile station and including designation of a called mobile station to designate a reserved channel stored in the second memory of an associated base station as a communication channel for the calling and called mobile stations to establish a connection with the mobile stations.

18 Claims, 4 Drawing Sheets

FIG.2A

| RESERVED CHANNEL NO. | BUSY/ IDLE FLAG |
|---|---|
| 1 | 0 |
| 5 | 1 |

BUSY/IDLE FLAG "0" : IDLE
"1" : BUSY

FIG.2B

| BASE STATION | CHANNEL NO. | BUSY/ IDLE FLAG | PREFERENCE FLAG |
|---|---|---|---|
| B1 | 1 | 0 | 1 |
| | 2 | 1 | 0 |
| | 3 | 1 | 0 |
| | 4 | 0 | 0 |
| | 5 | 1 | 1 |
| | ⋮ | ⋮ | ⋮ |
| | 64 | | |
| B2 | 1 | | |
| | 2 | | |
| | 3 | | |
| | 4 | | |
| | 5 | | |
| | ⋮ | ⋮ | ⋮ |
| | 64 | | |

PREFERENCE FLAG "1" : PREFERENTIALLY HANDLED
"0" : NORMAL

RADIO COMMUNICATION SYSTEM

INCORPORATION BY REFERENCE

The present application claims priority from Japanese application JP2004-240816 filed on Aug. 20, 2004, the content of which is hereby incorporated by reference into this application.

BACKGROUND OF THE INVENTION

The present invention relates to a radio communication system which includes a line controller, base stations, and mobile stations, and more particularly, to a radio communication system which has an improved architecture for assignment of a communication channel to a mobile station.

A standard has been established for a multi-channel access (MCA) radio system for airports which play an important role of ensuring the security of aircrafts existing in airports and the comfort of users. For example, see a document entitled "AIRPORT DIGITAL MOBILE TELECOMMUNICATION SYSTEM," ARIB STD T-87, October 2003 by Association of Radio Industries and Business (ARIB).

In a system conforming to the foregoing standard, an airport, which constitutes a basic unit, is composed of control station facilities, base station facilities, and mobile station facilities, wherein communications are made between a domestic terminal and a mobile station or between mobile stations (through a base station or directly) using a 400 MHz band. The system employs a quadruple TDM/TDMA scheme which separates a single radio carrier on a frame-by-frame basis and groups the frames into four slots for providing multiple channels. The system also employs a n/4 shifted QPSK modulation scheme. Specifically, a base station is assigned a single or a plurality of radio carriers (pair waves) from a 400 MHz band which is an available frequency band. Each of a downlink radio carrier f1 and an uplink radio carrier f2 is divided into frames which are sub-divided into slots which are then allocated to a control channel and a communication channel.

For special requirements of operational communications within an airport such as consistent security for aircraft, this system is also required to permit ensured emergency communications and preferential connections for crucial or important communications.

For example, in a communication system which employs a multi-channel access (MCA) scheme as described above, a plurality of communication channels are commonly used by a multiplicity of users.

In such a multi-channel access based communication system, a base station, in response to a connection request from a mobile station, designates a communication channel assigned from a line controller for the mobile station, thereby permitting the mobile station to make communications through the designated communication channel.

In this event, upon receipt of the connection request from the mobile station, the base station requests the line controller to assign a communication channel, thereby acquiring information on the communication channel to be designated for the mobile station, from the line controller.

JP-A-11-262044 discloses a communication channel assignment method which enables a quick response to an assignment request for one or a plurality of channels from a mobile station in a multi-carrier TDMA base station which selectively combines a plurality of carrier frequencies with a plurality of time slots formed in time division at each carrier frequency to establish a plurality of radio communication channels. This prior art system does not have a line controller, but the base station contains a management table which is registered with one or a plurality of idle channels selected from a plurality of communication channels as candidate channels. Upon receipt of a channel assignment request from a mobile station, the base station references the management table to select a communication channel which satisfies particular communication quality conditions from the candidate channels for assignment to the requesting mobile station. The level of a received radiowave on each channel is relied on to determine whether or not the channel is idle. Then, a candidate channel, determined to be an idle channel based on the level of a radiowave received thereon, is used to communicate with at least one mobile station, thereby checking whether or not this is an effective candidate channel.

SUMMARY OF THE INVENTION

However, in the conventional airport digital mobile communication system as described above, since processing for assigning a communication channel is not carried out until a connection is requested from a mobile station, the system inconveniently consumes a long time for designating a communication channel for the mobile station. In the radio communication system disclosed in JP-A-11-262044, while a channel request can be quickly responded with the aid of the management table which is used by the base station to register idle channel candidates, the radio communication system of JP-A-11-262044 does not have a line controller, so that it is necessary to determine whether or not each channel is idle by checking the level of a received radiowave on that channel. In other words, the base station must search idle channel candidates by itself at all times to create and constantly update the management table. Further, for candidate channels which have been determined to be idle based on the level of radiowaves received thereon, the base station must check whether or not each candidate channel is effective by communicating with at least one mobile station on the candidate channel, from which it seems impossible to avoid complicated control and increased circuit scale. In addition, this radio communication system is not sufficient from a viewpoint of usability because it does not consider a preferential connection request which is required for special applications such as an airport application.

It is therefore an object of the present invention to provide a highly usable radio communication system and radio communication method which are capable of quickly designating a communication channel for a mobile station in response to a connection request from the mobile station through a simple control with the aid of a line controller.

It is another object of the present invention to provide a radio communication system and a radio communication method which are capable of responding to special requirements in a special environment such as an airport.

A radio communication system according to one aspect of the present invention includes at least one base station, a plurality of mobile stations accommodated in the base station, and a line controller connected to the base station for managing or keeping tracking of communication channels possessed by the radio communication system. The line controller includes a first memory for managing or keeping track of each of the communication channels of the system for each base station as to whether the communication channel is occupied or idle. The base station includes a second memory for storing at least one of idle communication channels stored in the first memory as a reserved channel(s). The base station is responsive to a connection request generated from an arbitrary calling mobile station of the mobile stations and including designation of at least one called mobile station to designate the reserved channel stored in the second memory of the base station as a communication channel for at least the calling mobile station to establish a connection with the calling mobile station.

Here, the number of line controllers, the number of base stations, and the number of mobile stations may be respectively arbitrarily selected. A wired or a wireless communication is made between the base station and the line controller. Also, each of the base stations accommodates or location-registers mobile stations by managing identification information of the mobile stations which are present in the coverage area of the base station. A communication channel is identified, for example, by one or more of the frequency, a spread code when spread coding is applied, a time zone such as a time slot, and the like.

A variety of formats may be used for the connection request signal generated from the mobile station.

Preferably, the base station designates the reserved channel as a communication channel for the called mobile station as well to establish a connection with the called mobile station.

Preferably, the base station includes a connection notification unit for issuing a connection notification related to unconnected and connected mobile stations to the line controller, and the line controller comprises a channel notification unit, responsive to receipt of the connection notification, which shows that unconnected mobile stations include a mobile station which is accommodated in a base station different from the base station, to notify the different base station of a communication channel which should be assigned to the different base station.

Preferably, the base station includes a channel notification request unit for requesting the line controller for notification of an idle communication channel which is to be stored in the second memory as the reserved channel, and the line controller includes a channel notification unit responsive to the request for the notification of an idle communication channel from the base station to notify an idle communication channel stored in the first memory to the base station.

Here, the base station may request the line controller for notification of a communication channel to be designated in the future at any of various timings. For example, the request may be made at a timing at which the base station is activated, at a timing at which the base station designates a previously notified communication channel for a mobile station.

Preferably, the channel notification request unit issues the request for the notification of an idle communication channel when the base station is activated.

Preferably, the channel notification request unit issues the request for the notification of an idle communication channel when the reserved channels stored in the second memory have been assigned to communications of mobile stations so that idle channels are not available.

A radio communication system according to another aspect of the present invention includes at least one base station, a plurality of mobile stations accommodated in the base station, and a line controller connected to the base station for managing or keeping track of communication channels possessed by the radio communication system. The line controller includes a first memory for managing or keeping track of each of the communication channels of the system for each base station as to whether the communication channel is occupied or idle. The base station includes a second memory for storing at least one of idle communication channels stored in the first memory as a reserved channel(s). Each of the mobile stations includes a connection request unit for issuing a connection request to the base station, including designation of at least one called mobile station and designation of a preference for or a priority of a connection. The system further includes a preferential connection control unit responsive to a connection request having a high connection priority from an arbitrary calling mobile station to secure an idle communication channel from the communication channels possessed by the system to preferentially assign the secured communication channel to a communication associated with the connection request.

Here, a variety of information may be used for specifying the priority, for example, information indicating that a connection request should be preferentially handled, information indicating whether or not a connection request should be preferentially handled, or the like.

Preferably, the preferential connection control unit is responsive to a connection request having a high connection priority issued from the calling mobile station to preferentially assign a reserved channel stored in the second memory of the base station to the communication associated with the connection request.

Preferably, the reserved channels stored in the second memory of the base station include an idle communication channel for a connection request having a high connection priority, and the preferential connection control unit is responsive to a connection request issued from a calling mobile station and having a high connection priority to preferentially assign the idle communication channel for the connection request having a high connection priority stored in the second memory of the base station to a communication associated with the connection request.

Preferably, the preferential connection control unit is responsive to a connection request having a high connection priority issued from a calling mobile station to abort a communication through a communication channel being used and preferentially assign the communication channel freed thereby to a communication associated with the connection request when an idle communication channel is not currently available.

Thus, when a connection request issued from a mobile station should be preferentially handled but there is no idle communication channel available, a communication channel in use is forcedly freed and preferentially assigned to the mobile station which has requested the connection and another mobile station which is a connection requested party, thereby making it possible to quickly support, for example, an urgently required communication or call.

Here, a variety of manners or rules may be used for selecting an occupied communication channel to abort or disconnect an ongoing communication on the channel when no idle communication channel is available. For example, the preferential connection control unit may abort a communication through a communication channel not preferential.

A radio communication method according to another aspect of the present invention is used in a radio communication system which includes at least one base station, a plurality of mobile stations accommodated in the base station, and a line controller connected to the base station for managing or keeping track of communication channels possessed by the radio communication system, wherein the line controller includes a first memory for managing or keeping track of each of the communication channels of the system for each base station as to whether the communication channel is occupied or idle, and the base station including a second memory for storing at least one of idle communication channels stored in the first memory as a reserved channel(s). The radio communication method includes the steps of the base station requesting the line controller for notification of an idle communication channel which is to be stored in the second memory as the reserved channel, the line controller notifying the base station of an idle communication channel stored in the first memory in response to the request for the notification of an idle communication channel from the base station, an arbitrary calling mobile station of the mobile stations issuing a connection request including designation of at least one called mobile station to the base station, and the base station, in response to the connection request, designating the reserved channel stored in the second memory of the base station as a communication channel for at least the calling mobile station to establish a connection with the calling mobile station.

A radio communication method according to a further aspect of the present invention is used in a radio communication system which includes at least one base station, a plurality of mobile stations accommodated in the base station, and a line controller connected to the base station for managing or keeping track of communication channels possessed by the radio communication system, wherein the line controller includes a first memory for managing each of the communication channels of the system for each base station as to whether the communication channel is occupied or idle, and the base station includes a second memory for storing at least one of idle communication channels stored in the first memory as a reserved channel(s). The radio communication method includes the steps of an arbitrary calling mobile station of the mobile stations issuing to the base station a connection request including designation of at least one called mobile station and designation of a preference for a connection, and the system responding to a connection request having a high connection priority from an arbitrary calling mobile station to secure an idle communication channel from the communication channels possessed by the system to preferentially assign the secured communication channel to a communication associated with the connection request.

Other objects, features and advantages of the invention will become apparent from the following description of the embodiments of the invention taken in conjunction with the accompanying drawings.

DESCRIPTION OF THE EMBODIMENTS

In the following, some embodiments according to the present invention will be described with reference to the accompanying drawings, where like members are designated like reference numerals.

Figure 1:
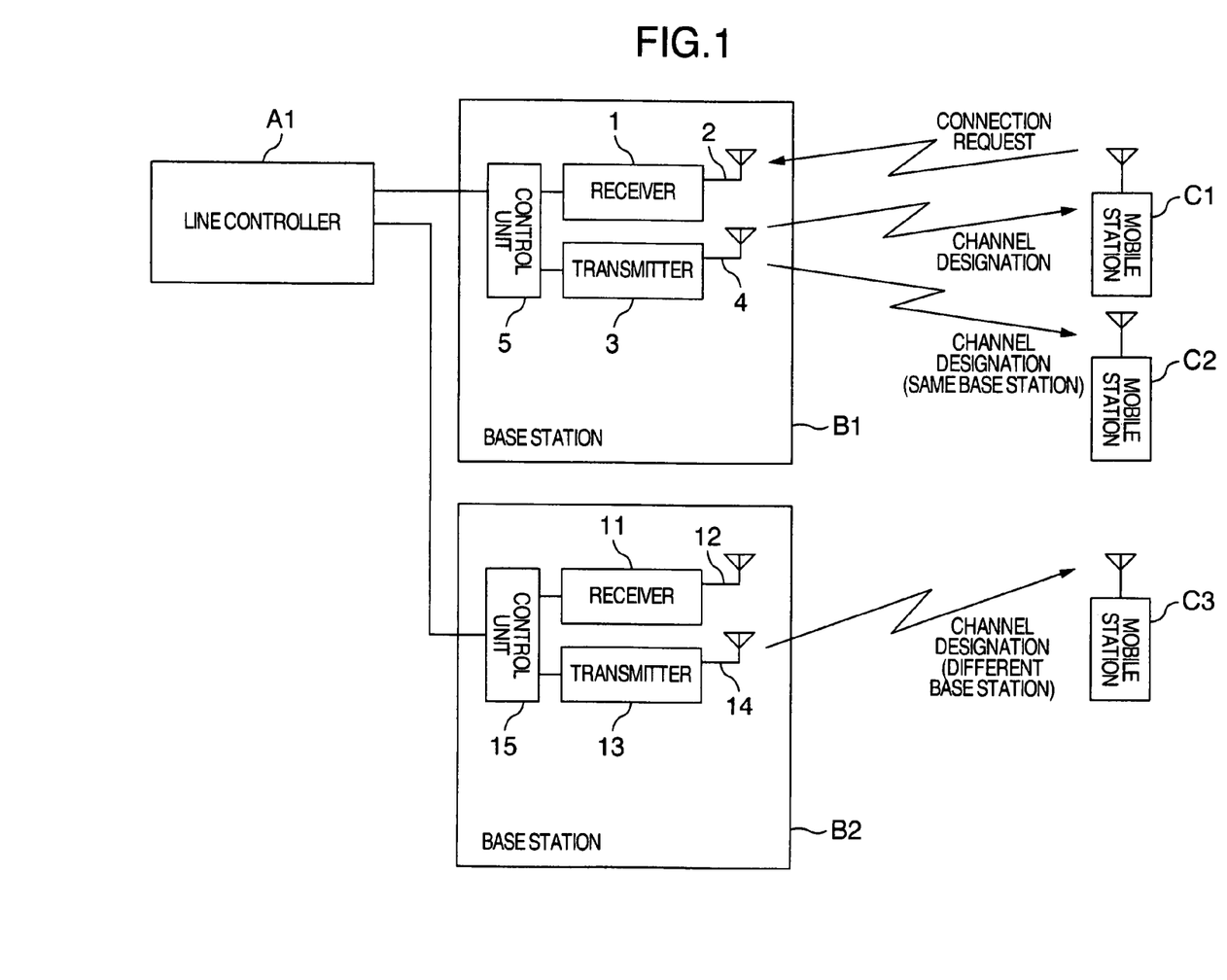
FIG. 1 is a block diagram illustrating an exemplary configuration of a radio communication system according to one embodiment of the present invention.

FIG. 1 illustrates an exemplary configuration of a radio communication system which employs a multi-channel access scheme according to one embodiment of the present invention.

The illustrated radio communication system comprises a line controller A1, a plurality of base stations B1, B2, and a plurality of mobile stations C1-C3.

The base stations B1, B2 comprises a receiver 1, 11 and an associated antenna 2, 12; a transmitter 3, 13 and an associated antenna 4, 14; and a control unit 5, 15, respectively.

The line controller A1 and each of the plurality of base stations B1, B2 are connected to each other, so that the plurality of base stations B1, B2 are accommodated in the line controller A1. The mobile stations C1, C2 are roaming in a coverage area of the base station B1, so that the mobile stations C1, C2 are accommodated in the base station B1. The mobile station C3 in turn is roaming in a coverage area of the base station B2, so that the mobile station C3 is accommodated in the base station B2.

The line controller A1 provides a function of managing or keeping track of a line use status of the multi-channel accessing (communication channel use status); a function of creating control information for transmission to the base stations B1, B2; a function of receiving and analyzing control information transmitted from the base stations B1, B2; a function of instructing a mobile station to use a line (use a communication channel) through control information transmitted or received between the mobile station and the line controller A1; and the like.

In this embodiment, the line controller A1 is connected to the respective base stations B1, B2 through wired lines and communicates signals such as the control information to and from the base stations B1, B2 through the wired lines.

Each of the base stations B1, B2 provides a function of communicating signals such as control information, call information and the like over the air with the mobile stations C1-C3 accommodated therein; a function of communicating signals such as control information and the like with the line controller A1; and the like.

Specifically, each of the base stations B1, B2 provides a function of receiving and demodulating control information transmitted over the air from the mobile stations C1-C3 through the antenna 2, 12 and receiver 1, 11 to deliver the demodulated control information to the control unit 5, 15; a function of modulating control information delivered from the control unit 5, 15 by the transmitter 3, 13 to transmit the modulated control information over the air from the antenna 4, 14 to the mobile stations C1-C3; a function of communicating control information and the like with the line controller A1 through the control unit 5, 15; and the like.

Each of the mobile stations C1-C3 provides a function of communicating signals such as control information, call information and the like over the air with the base station B1 or B2 which accommodates the mobile station C1-C3; a function of placing a call, receiving a call, displaying a variety of images, and the like in response to an operation made on a key, a button or the like by a user (human).

In the radio communication system according to this embodiment, radio communications are made while a plurality of communication channels, which differ, for example, in frequency, time zone (slot number) or the like, are dynamically assigned to the mobile stations C1-C3. In this embodiment, the line controller A1 is responsible for the overall assignment and management or keeping track of the communication channels, while each of the base stations B1, B2 designates a communication channel for the mobile station C1, C2 or C3 accommodated therein, and the mobile stations C1, C2, C3 make radio communications through respective communication channels assigned thereto.

The mobile station can communicate with all other mobile stations in a group to which the mobile station itself belongs in addition to a communication with one mobile station designated thereby as the destination. This communication mode will be described below in connection with an airport digital mobile communication system to which the radio communication system according to this embodiment is applied. For example, all airport workers such as pilots of aircraft, other flight attendants, ground crew, clerks, and the like carry mobile stations, and all vehicles such as cars used for operations in the airport are equipped with mobile stations. The airport digital mobile communication system classifies these airport workers into arbitrary groups such as a group of the pilots of aircraft, a group of other flight attendants, a group of ground crew, and a group of clerks, and a group ID is set to a mobile station carried by each worker. This grouping permits a simultaneous delivery to all mobile stations belonging to an arbitrary group designated by a mobile station or a base station, and a simultaneous delivery from an ordinary mobile station to all mobile stations belonging to a predetermined group(s).

The communication channel used herein may be, for example, a call channel for use in telephone calls, data communications and the like.

The radio communication system which employs the multi-channel access scheme according to a first embodiment of the present invention will be described with reference to FIGS. 1, 2A, 2B, 3.

Referring first to FIG. 1, the line controller A1 previously notifies the respective base stations B1, B2 of control information which includes information on the assignment of communication channels to be designated for mobile stations from which a connection request is forthcoming thereafter, namely, communication channel assignment information.

Each of the base stations B1, B2 has a table (memory table) 20, for example, in a memory of the control unit 5, 15 for storing the communication channel assignment information notified from the line controller A1.

Figure 2A:
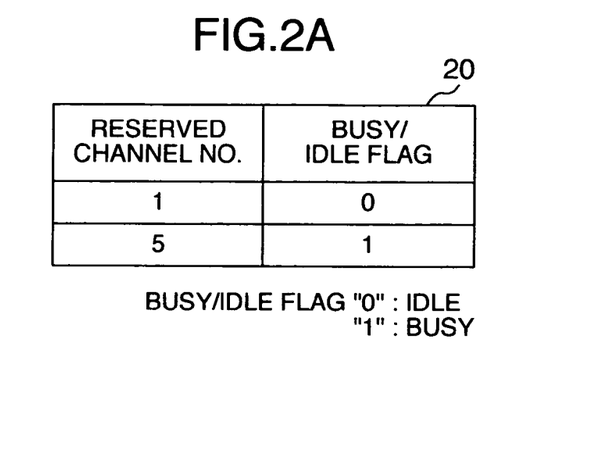
FIG. 2A is a diagram showing an example of a memory table for use by a base station.

FIG. 2A shows an example of such a memory table 20 which stores reserved channel information as the communication channel assignment information. The reserved channel information includes two reserved channel numbers, and a flag indicative of whether each reserved channel is occupied or idle. In the shown example, communication channels labeled channel numbers 1, 5, respectively, are currently assigned to an associated base station as reserved channels, where the flag associated with the communication channel labeled channel number 1 is "0" indicating that the communication channel is idle, while the flag associated with the communication channel labeled channel number 5 is 1" indicating that the communication channel is occupied in the associated base station. It should be understood that the reserved channel information can include one or three or more communication channels as required.

Figure 2B:
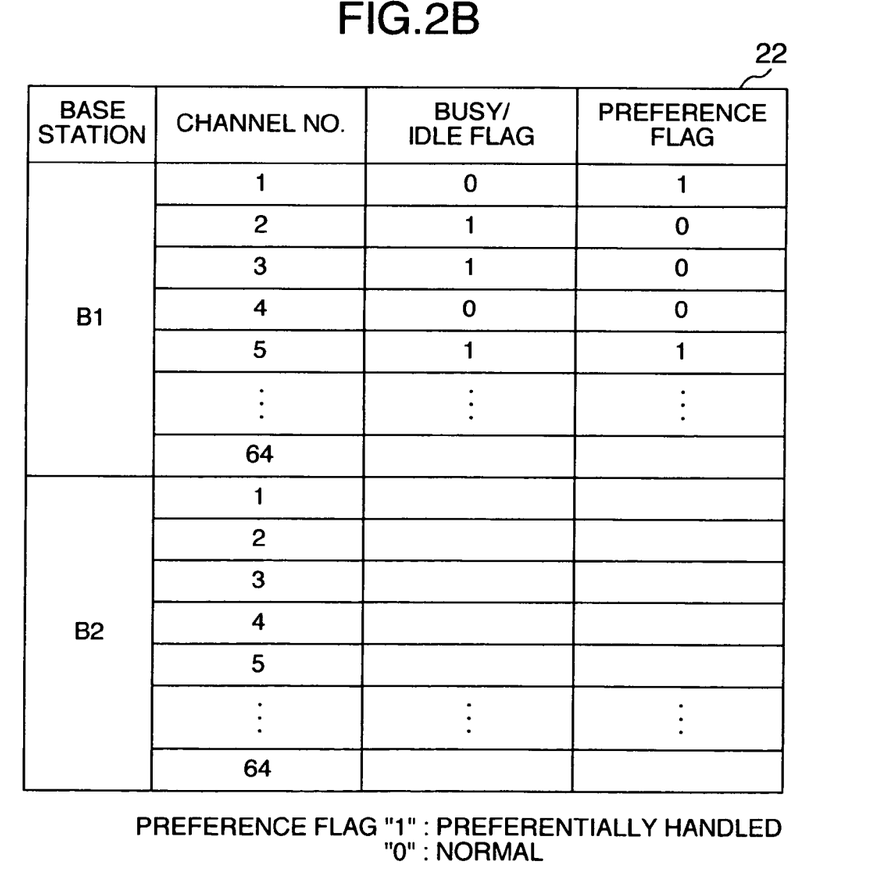
FIG. 2B is a diagram showing an example of a memory table for use by a line controller.

FIG. 2B shows an example of a memory table 22 for describing how communication channels are managed in the line controller A1. This memory table 22 includes a communication channel number for identifying each communication channel, an busy/idle flag, and a preference flag to be described later, for each communication channel in order to manage or keeping track of the communication channels for each base station. The memory table 22 may include a variety of items to be managed other than the foregoing as required. The line controller A1 manages and keeps track of communication channels assigned to each base station at all times as to whether each communication channel is occupied or idle using the memory table 22. For example, as will be later described with reference to FIG. 3, when the base station B1 assigns a communication channel 5, which has been previously assigned to be a reserved channel, to a mobile station which makes a connection request, and sends a connection notification T13 indicative of this assignment to the line controller A1, the line controller A1 sets the busy/idle flag of the communication channel 5 within the memory table 22 to "1," indicating that the communication channel 5 is occupied. When the communication channel 5 is assigned in response to a preferential connection request from a calling mobile station to be described later in connection with a second embodiment, the line controller A1 sets the associated preference flag to "1." The line controller A1 keeps track of idle communication channels at all times using the memory table 22, such that the line controller A1 picks up one idle communication channel from the memory table 22 for assignment to the base station as a reserved channel as soon as idle communication channels are used up from reserved channels previously assigned to the base stations B1, B2, and sets the busy/idle flag associated with the assigned communication channel to "1" in the memory table 22. Likewise, upon receipt of a normal channel connection request (T21 in FIG. 3), which is not urgent, from a base station, the line controller A1 also picks up an idle communication channel from the memory table 22, and notifies the base station of the assigned communication channel (T22 in FIG. 3).

Communication channels to be previously notified to the respective base stations B1, B2 from the line controller A1 may be different channels for each of the base stations B1, B2, or the same communication channels common to two or more base stations B1, B2.

The system illustrated in FIG. 1 has, for example, 128 communication channels as a whole to distributively assign them to the respective base stations. In the system which has two base stations as in FIG. 1, 64 channels may be equally assigned to each of the base stations B1, B2, or different numbers of communication channels may be assigned to the respective base stations, as required. The memory table 22 in FIG. 2B shows that 64 channels are equally assigned to each of the base stations B1, B2.

Figure 3:
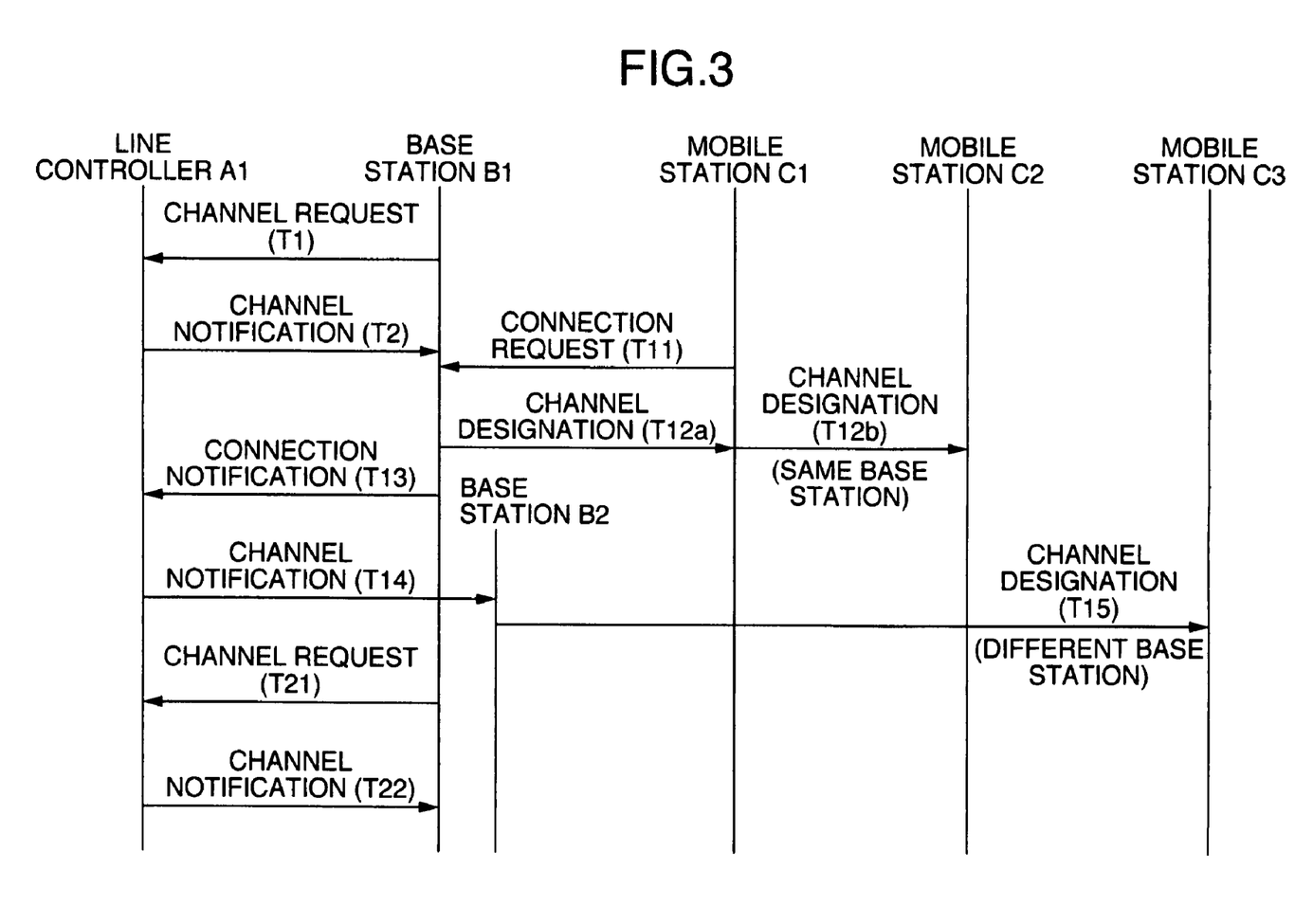
FIG. 3 is a flow diagram for describing an exemplary processing flow performed in the radio communication system in accordance with one embodiment.

Reference is made to FIG. 3 which shows a processing sequence performed in the radio communication system in accordance with the multi-channel access scheme of this embodiment.

This example will be described in connection with the system, as illustrated in FIG. 1, which has the base stations B1, B2 accommodated in the line controller A1; the mobile stations C1, C2 accommodated in the base station B1; and the mobile station C3 accommodated in the base station B2.

First, the control unit 5 of the base station B1 requests the line controller A1 for assignment of an available communication channel through a channel request signal T1 immediately after the base station B1 has been activated. In response to the request, the line controller A1 designates one of idle communication channels, if any, for the base station B1, and notifies the base station B1 of the assignment through a channel notification signal T2. The control unit 5 of the base station B1 holds information (communication channel assignment information) for identifying the communication channel notified (designated) from the line controller A1 in a memory (the memory table 20 as shown in FIG. 2A in this example) within the base station B1. The other base station B2 also performs a similar processing sequence.

Assume that after the communication channel assignment information on the communication channel to be next designated has been previously set in the base station B1, the mobile station C1 accommodated in the base station B1 makes a connection request for connection with the mobile station C2 to the base station B1 through a connection request signal T11.

In this event, in response to receipt of the connection request signal from the mobile station C1, the control unit 5 of the base station B1 designates a communication channel identified by the communication channel assignment information held in the memory for a communication between the mobile station C1 which is a calling party and the mobile station C2 which is a called party, and notifies these mobile stations C1, C2 of the designated communication channel through channel designation signals T12a, T12b, respectively.

Simultaneously with the foregoing designation (or with a certain time difference), the base station B1 notifies the line controller A1 of the connection through a connection notification signal T13 in order to notify the line controller A1 that the communication channel identified by the communication channel assignment information held therein has been assigned to the mobile stations C1, C2 and in order to assign a communication channel to the mobile station C3 located in the other base station B2 (i.e., accommodated in the other base station B2). In other words, the connection notification signal T13 provides the line controller A1 with information on unconnected and connected mobile stations.

In response, the line controller A1 recognizes that the base station B1 has assigned the communication channel notified from the line controller A to the mobile stations C1, C2. In addition, when mobile stations accommodated in the other base station B2 also include the mobile station C3 which should be a called party, the line controller A1 notifies, for example, the same communication channel (or a different but available communication channel) to the base station B2 which accommodates the mobile station C3, which is a called party, through a channel notification signal T14. In this event, the base station B2 designates a communication channel through a channel designation signal T15 for the mobile station C3.

When the communication channel assignment information indicates that there is no communication channels which are held in the memory as undesignated for mobile stations (communication channels which have not yet been designated for mobile stations), i.e., when the base station B1 has designated communication channels previously notified from the line controller A1 to mobile stations, the base station B1 immediately requests the line controller A1 for assignment of a communication channel(s) through a channel request signal T21, and thereby receives the assignment of a communication channel(s) from the line controller A1 through a channel notification signal T22, and holds the communication channel assignment information for preparation of the next communication.

From then on as well, the line controller A1 repeats similar operations to control communication channels.

The channel designation signals T12a, T12b, T15 from the base stations B1, B2 to the mobile stations C1-C3 are transmitted, for example, using a designated communication channel, but may be transmitted using another communication channel.

As described above, the radio communication system in accordance with the multi-channel access scheme of this embodiment has the line controller A1, one or plurality of base stations B1, B2, and a plurality of mobile stations C1-C3 which share a plurality of communication channels, and assigns the communication channels to the mobile stations C1-C3 as required. In this configuration, the radio communication system performs the communication channel control process as described below.

Specifically, the assignment of communication channels in response to connection requests from the mobile stations C1-C3 is previously set from the line controller A1 to the base stations B1, B2, and a connection response is sent back with a communication channel assigned from the base stations B1, B2 in response to a connection request from the mobile stations C1-C3. In this way, it is possible to reduce a time required for the assignment of a communication channel to the mobile station C1-C3 from the line controller A1, and to reduce a connection time for the mobile stations C1-C3. Also, the base stations B1, B2 can designate the assignment of a communication channel in response to a connection request from the mobile station C1-C3 in a short time.

Also, the radio communication system of this embodiment makes radio communications in accordance with the multi-channel access scheme in the following manner.

Specifically, one or two or more communication channels have been previously assigned to each of the plurality of base stations B1, B2 as reserved channels in order to respond to a connection request from an arbitrary one of the mobile stations C1-C3. When an arbitrary one of the mobile stations C1-C3, which is a calling party, makes a connection request for a connection to one of the mobile stations C1-C3 which is a called party location-registered (accommodated) in the same base station, the base station B1 or B2 responds to the connection request from the calling mobile station by designating the previously assigned reserved channel therefor, and also designates a reserved communication channel (or another one if there is no idle channel available) for the called mobile station. If the base station in which the calling mobile station is location-registered in a base station which is different from a base station in which the called mobile station is location-registered, the connection request from the calling mobile station is sent from the base station B1 or B2, in which the calling mobile station is location-registered, to the line controller A1 as a connection notification (T13). Upon receipt of the connection request, the line controller A1 references the memory table 22, and sends a connection request (channel notification T14) which designates a communication channel to be used to the base station B1 or B2 in which the called mobile station is location-registered. The designated communication channel in this event is a reserved communication channel or another communication channel if there is no reserved channel which is idle. Upon receipt of the connection request, the base station B1 or B2 transmits a connection response (channel designation T15) to the mobile stations C1-C3 to which the connection request is directed. A call is placed through the communication channel designated by the foregoing processing procedure (control), thereby permitting the calling mobile station which has made the connection request to make a call to the called mobile station.

As appreciated from the foregoing, the radio communication system of this embodiment can provide at least advantages (1)-(4) as described below.

(1) When a connection request is made by an arbitrary one of the mobile stations C1-C3 within the coverage area of a certain base station, the base station immediately responds to the connection request by designating a channel for the other mobile stations C1, C2 or C3. Therefore, for example, when there is a single base station, it is possible to reduce a connection time from the connection request to the designation of a channel, for example, to approximately one-half as long as the conventional system, for example, for a communication between the mobile stations C1-C3 which lie within the coverage area of the single base station.

(2) When there is a single base station, a comfortable operability can be provided for the operators (users) of the mobile stations C1-C3 because of a reduction in a connection waiting time.

(3) Even when there are a plurality of base stations B1, B2, the advantages (1), (2) can be provided for a communication between mobile stations which lie within the coverage area of the same base station B1 or B2.

(4) When a communication is made between the mobile stations C1-C3 which lie in the coverage areas of different base stations B1, B2, a connection waiting time is reduced particularly for a calling user.

As described above, in the radio communication system of the first embodiment, in which the line controller A1 manages or keeps track of communication channels for assignment to communications, the line controller A1 has previously notified each of the base stations B1, B2 of a communication channel which should be assigned for the next connection request, so that when the next connection request is made from any of the mobile stations C1-C3, the base station B1 or B2 can directly designate the communication channel, thereby making it possible to reduce a time taken to designate a communication channel for the mobile stations C1-C3, and to reduce a communication connection time required up to the assignment of a communication channel. It is therefore possible to quickly designate a communication channel for a mobile station in response to a connection request from a mobile station.

In the foregoing embodiment, the channel controller A1 has previously assigned idle channels (unused communication channels) to the base stations B1, B2 to complete a connection of a calling mobile station C1, C2 or C3 with the base station which is location-registered with the calling mobile station in a short time, so that the connection can be promptly completed (for example, within 0.3 seconds) to accomplish a high speed access. Similarly, a connection can be completed in a short time for a called mobile station C1-C3 which belongs to the same base station B1 or B2. Further, even when the called mobile station is accommodated in the base station B1 or B2 which is different from the base station B2 or B1 which accommodates the calling mobile station, a final connection can be quickly completed (for example, within 0.8 seconds). In this event, the base station B1 or B2 which accommodates the calling mobile station immediately responds to a connection request from the mobile station C1, C2 or C3 and then performs operations for establishing an actual call spreading across the base stations B1 and B2. Stated another way, the calling mobile station C1-C3 receives a response signal as if a connection has been immediately made, followed by the actual connection which is made across the base stations B1 and B2. In this way, even in regard to a call over different base stations, a calling user at least apparently feels that the call can be immediately made, and can therefore enjoys a call without any stress.

Here, in the foregoing embodiment, the line controller A1 previously notifies the base stations B1, B2 of the assignment of communication channels so that the base stations B1, B2 set the communication channels as candidates. Additionally, the assigned communication channels set in the base stations B1, B2 (communication channel assignment information in this embodiment) may be deleted or modified at any time by a control signal or the like from the line controller A1 in accordance with a particular communication situation or the like, by way of example.

Also, when a plurality of available communication channels have all been assigned so that there is no communication channel available, the line controller A1 cannot assign any communication channel, but the line controller A1 may forcedly create an idle communication channel for assignment depending, for example, on a communication situation or the like.

Also, as in the foregoing embodiment, a communication may be made by performing at all times the radio channel control scheme which involves a previously notification of the assignment of communication channels from the line controller A1 to the base stations B1, B2 for setting them as candidates. Alternatively, the communication channel control scheme of this embodiment may be switched to or conducted in combination with another communication channel control scheme (for example, a normal scheme in which the line controller A1 assigns a communication channel after a connection request is made from any of the mobile stations C1-C3) in response to an instruction signal generated by any of the line controller A1, base stations B1, B2, mobile stations C1-C3, and other communication devices included in the radio communication system. This is because a quick connection is not necessarily required for all calls in general.

It should be understood that the radio communication system as described in the foregoing embodiment is not limited to a communication system in an airport, but can be applied to general digital communications.

In the mobile stations C1-C3, a connection requesting unit is implemented by a function of transmitting the connection request signal T11 over the air.

Also, in the line controller A1 of the foregoing embodiment, a designated communication channel notification unit is implemented by a function of previously notifying the base stations B1, B2 of communication channels to be designated by generating the channel notification signals T2, T22.

Also, in the base stations B1, B2 of the foregoing embodiment, a designated communication channel identification information storage unit is implemented by a function of storing information for identifying a communication channel to be designated in the future in the memory table 20 as shown in FIG. 2A (the communication channel assignment information in this embodiment); a connection request receiver unit is implemented by a function of receiving the connection request signal T11 generated from the mobile stations C1-C3 over the air; and a communication channel designation unit is implemented by a function of generating the communication channel designating signals T12a, T12b for designating a communication channel for the mobile stations C1-C3.

In the base stations B1, B2 of the foregoing embodiment, on the other hand, a connection notification unit is implemented by a function of generating the connection notification signal T13 for notifying the line controller A1 of a connection situation with the mobile stations C1-C3; and a connection communication channel designation unit is implemented by a function of generating the channel designation signal T15 for designating a communication channel for the mobile station C1-C3 which takes the position of a connection requested party through a connection request.

Further, in the line controller A1 of the foregoing embodiment, a connection communication channel notification unit is implemented by a function of generating the channel notification signal T14 for notifying a communication channel to be designated for a base station (another base station) different from a base station which receives a connection request.

Also, in the base stations B1, B2 of the foregoing embodiment, a designated communication channel notification request unit is implemented by a function of generating the channel request signals T1, T21 for requesting the line controller A1 to notify a communication channel to be designated.

A second embodiment of the present invention will now be described with reference to FIGS. 1 and 4.

In this embodiment, in the radio communication system illustrated in FIG. 1, a connection request made from any of the mobile stations C1-C3 is preferentially handled by preferentially using one of communication channels previously assigned to the base stations, as described in the first embodiment.

Figure 4:
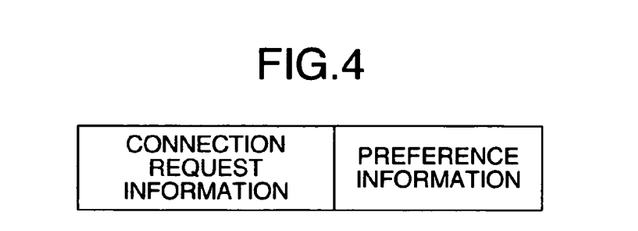
FIG. 4 is a diagram showing an example of a connection request signal.

FIG. 4 shows an example of a connection request signal generated by the mobile stations C1-C3.

The connection request signal in the second embodiment includes connection request information indicative of a connection request; and preference information indicative of whether or not the associated connection request should be preferentially handled. The mobile stations C1-C3 each can control the preference information included in the connection request signal transmitted to the base station B1 or B2 over the air to switch between a connection request signal which should be preferentially handled and a connection request signal (for example, normal) which should not be preferentially handled for transmission over the air. The setting as to whether a particular connection request is preferential or not may be made by an arbitrary means such as by depressing a setting button provided on the mobile station.

A variety of formats may be used for the connection request signal.

In this embodiment, the preference information included in the connection requests signal generated from the mobile stations C1-C3 is analyzed by the base stations B1, B2 or line controller A1. When the connection request signal includes the preference information which indicates that the request should be preferentially handled, a communication channel previously assigned to the base station B1 or B2 is preferentially assigned to a mobile station C1-C3 which has generated the connection request signal and a mobile station C1-C3 which is in a position of a connection requested party. When the connection request signal generated from the mobile station C1-C3 does not include the preference information which indicates that the request should be preferentially handled, a communication channel may be assigned, for example, such that the line controller A1 references the memory table 22 to assign an idle communication channel after the connection request has been made from the mobile station C1-C3.

As described above, in the radio communication system in accordance with the multi-channel access scheme of this embodiment, when a connection request from an arbitrary mobile station C1-C3 to another arbitrary mobile station C1-C3 includes a signal indicative of a preferential connection, a predetermined communication channel is preferentially assigned to a connection of the other arbitrary mobile station C1-C3 with a base stations B1, B2 which is registered with that mobile station C1-C3. Alternatively, for example, an ongoing call may be forcedly interrupted, such that the connection is made using a communication channel which has been used for that call. This strategy will be described in detail in the next embodiment.

Accordingly, a mobile station C1-C3 which requires, for example, an urgent communication or call can preferentially secure a communication channel between the mobile station and a connection requested party to immediately start a communication by generating a connection request signal which includes information indicating that a preferential connection is required.

The base stations B1, B2 or line controller A1 in this embodiment comprises a preferential connection control unit which is implemented by a function of preferentially designating a communication channel based on information indicative of the priority (the preference information in this embodiment) included in a connection request made from the mobile station C1-C3 when the connection request should be preferentially handled.

A third embodiment of the present invention will be described with reference to a flow chart of FIG. 5.

In this embodiment, in the radio communication system illustrated in FIG. 1, where a connection request made from any of the mobile stations C1-C3 can be preferentially handled in response to the connection request signal including the preference information as shown in FIG. 4, an idle communication channel is secured when all communication channels are being occupied.

Figure 5:
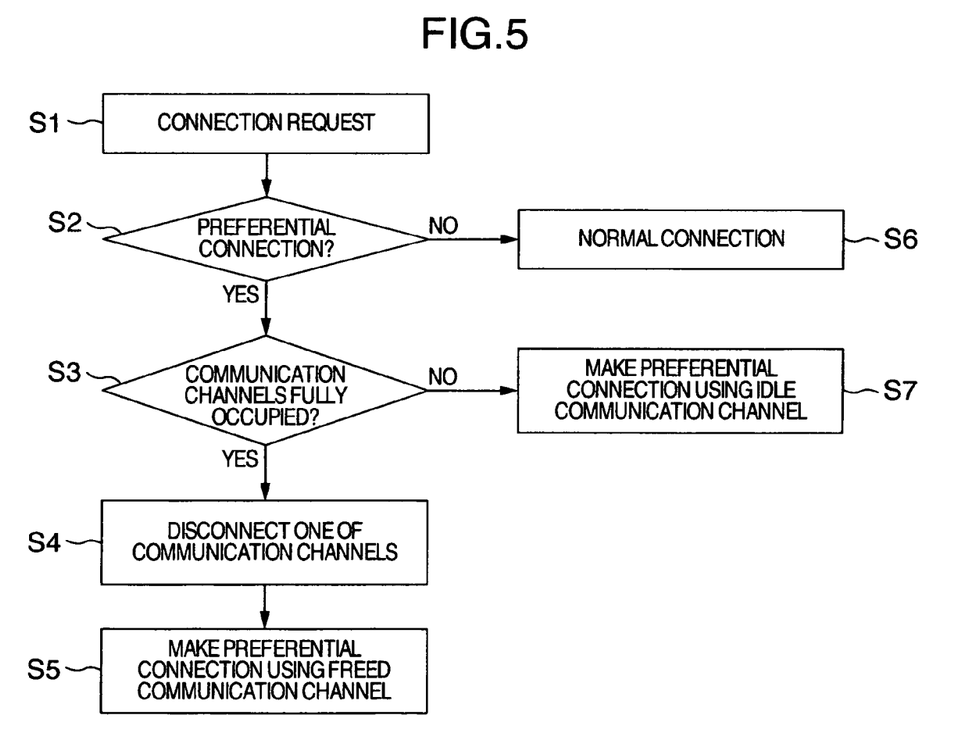
FIG. 5 is a flow chart illustrating an exemplary processing flow performed in the radio communication system according to one embodiment.

Reference is made to FIG. 5 which illustrates an exemplary processing procedure performed in the radio communication system of the third embodiment.

First, as any of the mobile stations C1-C3 generates a connection request signal (step S1), the connection request signal is received by the base station B1 or B2 which is location-registered with (accommodates) the mobile station C1, C2 or C3. Then, the base station B1 or B2 or the line controller A1 determines based on the preference information included in the connection request signal whether or not the connection request signal requests a preferential connection (step S2). As a result, if the connection request signal does not request a preferential connection, a normal connection is made (step S6).

On the other hand, when the connection request signal requests a preferential connection, the base station B1 or B2 or the line controller A1 determines whether or not communication channels are fully occupied between the calling mobile station C1, C2 or C3 and the base station B1 or B2 which has location-registered the mobile station C1, C2 or C3, and whether or not communication channels are fully occupied between a called mobile station C1, C2 or C3 and the base station B1 or B2 which has location-registered the called mobile station C1, C2 or C3 (step S3). These determinations can be made, for example, by referencing the memory table 22 of the line controller A1. As a result of the determinations, when the communication channels are not fully occupied between the mobile station C1, C2 or C3 and the base station B1 or B2, i.e., when there is an idle communication channel, the connection is preferentially made using the idle communication channel (step S7).

On the other hand, when the communication channels are fully occupied between the mobile station C1, C2 or C3 and the base station B1 or B2, a communication made by another mobile station or the like through any communication channel is disconnected (step S4), for example, in accordance with a predefined condition, and the requested connection is preferentially made using the freed communication channel resulting from the disconnection (step S5). In this event, the base station B1 or B2 notifies the other mobile station of a preferential connection, and subsequently disconnects the communication channel after the lapse of a predetermined time period.

Now, examples will be given to the predefined condition under which "any communication channel is disconnected" at step S4 when "the communication channels are fully occupied," as determined at step S3.

EXAMPLE 1 among communication channels with the preference flag set at "0" (indicative of a normal connection), a communication channel is selected in order from the one having the smallest channel number (or the largest channel number) and is disconnected.

EXAMPLE 2 among communication channels with the preference flag set at "0" (indicative of a normal connection), a communication channel which has been used for a long time is selected and disconnected. In this event, the base station should store the order in which the idle/occupied flag is set to "1" in each connection request, or measure a time period for which the busy/idle flag remains at "1."

Further, when any communication channel is to be disconnected, a signal indicative of the disconnection may be multiplexed on speech data communicated on the communication channel, so that the operator of the mobile station in communication can previously know that the communication will be disconnected by generating, for example, a speech saying "the communication will be disconnected" during a call which is being made using the mobile station through the communication channel.

Whether the communication channels are fully occupied or not may be determined, for example, based on the communication channel management performed by the base stations B1, B2 and line controller A1 (with reference to the memory table 22 in FIG. 2B or the like). Alternatively, if no information for identifying a communication channel to be next designated (communication channel assignment information) is not stored in the memory table as shown in FIG. 2A, provided in the base stations B1, B2, a determination can be made that there is no idle communication channel, i.e., the communication channels are fully occupied.

As described above, in the radio communication system in accordance with the multi-channel access scheme of this embodiment, when the communication channels are fully occupied at the time a connection request signal indicative of a preferential connection is generated from a certain mobile station C1, C2 or C3, the associated base station sends a signal which indicates that a preferential connection is requested to another mobile station which is in connection through a predetermined communication channel, and disconnects the communication (for example, in a certain time period) to establish a communication channel for the mobile station C1-C3 which has requested for the preferential connection.

Therefore, even if there is no idle communication channel, i.e., all the communication channels are fully occupied at the time a connection request signal is generated from a mobile station C1-C3, which needs to make an urgent communication or call, in order to preferentially establish a connection therefor, the base station or line controller aborts a communication through a communication channel used by another mobile station or the like and preferentially uses the communication channel freed thereby for a connection associated with the urgent communication, so that the communication channel can be preferentially secured between the mobile station which has requested the urgent connection and a connection requested party, thus permitting the mobile station to start a communication.

Each of the base stations B1, B2 and line controller A1 comprises a preferential connection control unit which is implemented by a function of preferentially handling a connection request generated from the mobile station C1, C2 or C3 based on information indicative of the priority (the preference information in this embodiment) included in the connection request by interrupting a communication to ensure an idle communication channel when there is no idle communication channel, and then preferentially designating the communication channel.

The radio communication system, line controller, base station, mobile station and the like according to the present invention are not necessarily limited to the configurations shown above, but may be implemented in a variety of configurations. Also, the present invention can provide the method or scheme for executing the processes according to the present invention, a program for implementing such a method and scheme, a recording medium which has recorded the program thereon, and the like. The present invention can further provide a variety of apparatuses and systems which implement the foregoing method and scheme.

The present invention is not necessarily limited to the field of applications shown above, but can be applied to a variety of applications.

A variety of processes executed by the radio communication system, line controller, base station, mobile station and the like may be controlled, for example, by a processor which executes a control program stored in a ROM (Read Only Memory) included in hardware resources which comprise the processor, memory and the like. Alternatively, respective function units which execute associated processes may be implemented by independent hardware circuits.

The present invention can also take the form of a computer readable recording medium such as a floppy (registered trademark) disk, CD (Compact Disc)-ROM or the like which stores the control program, or the program itself, in which case the processes associated with the present invention can be carried out by loading the control program from the recording medium into a computer and having a processor execute the control program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication system comprising:
   at least one base station;
   a plurality of mobile stations accommodated in said base station; and
   a line controller connected to said base station for managing communication channels possessed by said radio communication system,
   said line controller including a first memory for keeping track of each of the communications channels of said system for each base station as to whether each communications channel is occupied or idle, said base station including a second memory for storing at least one of said idle communication channels stored in said first memory as reserved channels, wherein said base station is responsive to a connection request generated from an arbitrary calling mobile station of said mobile stations, said connection request including designation of at least one called mobile station, to designate a reserved channel stored in said second memory included in said base station as a communication channel for at least said calling mobile station to establish a connection with said calling mobile station, and when all of the reserved channels stored in said second memory have already been assigned to communications of mobile stations so that no idle channel is available, said base station issues a request for notification of an idle communication channel to said line controller so that said line controller can assign one of the idle communication channels that are kept track of by said line controller to said base station as a reserved channel.

2. A radio communications system according to a claim 1, wherein said base station designates the reserve channel as a communication channel for said called mobile station as well to establish a connection with said called mobile station.

3. A radio communication system according to claim 1, wherein said base station includes a connection notification unit for issuing a connection notification related to unconnected and connected mobile stations to said line controller, and wherein said line controller comprises a channel notification unit which is responsive to receipt of the connection notification which shows that unconnected mobile stations include a mobile station which is accommodated in a base station different from said base station to notify said different base station of a communications channel which should be assigned to said different base station.

4. A radio communication system according to claim 1, wherein said base station includes a channel notification request unit for requesting said line controller for notification of an idle communication channel which is to be stored in said second memory as the reserved channels, and wherein said line controller includes a channel notification unit responsive to the request for the notification of an idle communication channel from said base station to notify said base station of idle communication channels stored in said first memory.

5. A radio communication system according to claim 4, wherein said channel notification request unit issues the request for the notification of an idle communication channel when said base station is activated.

6. A radio communication system comprising:

at least one base station;

a plurality of mobile stations accommodated in said base station;

a line controller connected to said base station for managing communication channels possessed by said radio communication system, wherein said line controller includes a first memory for keeping track of each of the communications channels of said system for each base station as to whether the communications channel is occupied or idle, wherein said base station includes a second memory for storing at least one of idle communication channels stored in said first memory as reserved channels, wherein each of said mobile stations connection request unit for issuing a connection request to said base station, said connection request including designation of at least one called mobile station with or without designation of a priority for a connection, and wherein said base station is responsive to a connection request generated from an arbitrary calling mobile station of said mobile stations, said connection request including designation of at least one called mobile station without designation of a priority for connection, to designate a reserved channel stored in said second memory included in said base station as a communication channel for at least said calling mobile station to establish a connection with said calling mobile station, when all of the reserved channels stored in said second memory have already been assigned to communications of mobile stations so that no idle channel is available, said base station issues a request for notification of an idle communication channel to the line controller so that the line controller can assign one of the idle communication channels that are kept track of by the line controller to said base station as a reserved channel; and a preferential connection control unit responsive to a connection request including designation of at least one called mobile station with designation of a high connection priority from an arbitrary calling mobile station to secure an idle communication channel from the communication channels possessed by said system to preferentially assign the secured communication channel to a communication associated with said connection request.

7. A radio communication system according to claim 6, wherein said preferential connection control unit is responsive to a connection request having a high connection priority issued from a calling mobile station to preferentially assign a reserved channel stored in said second memory of said base station to a communication associated with said connection request.

8. A radio communication system according to claim 7, wherein the reserve channel stored in said second memory of said base station includes an idle communication channel for a connection request having a high connection priority, and wherein said preferential connection control unit is responsive to a connection request issued from a calling mobile station and having a high connection preference to preferentially assign the idle communication channel stored in said second memory of said base station from the connection request having a high connection priority to a communication associated with said connection request.

9. A radio communication system according to claim 6, wherein said preferential connection control unit is responsive to a connection request having a high connection priority issued from a calling mobile station to abort a communication through a communication channel being used and preferentially assign the communication channel freed thereby to a communication associated with said connection request when no idle communication channel is currently available.

10. A radio communication method in a radio communication system which comprises at least one base station, a plurality of mobile stations accommodated in said base station, and a line controller connected to said base station for managing communication channels possessed by said radio communication system, said line controller including a first memory for keeping track of each of the communication channels of said system for each base station as to whether the communication channel is occupied or idle, and said base station including a second memory for storing at least one of idle communication channels stored in said first memory as a reserved channel, said method comprising the steps of:

said base station requesting said line controller for notification of an idle communication channel which is stored in said second memory as the reserved channel;

said line controller notifying said base station of an idle communication channel stored in said first memory in response to the request for the notification of an idle communication channel from said base station; an arbitrary calling mobile station of said mobile stations issuing a connection request including designation of at least one called mobile station to said base station;

said base station, in response to the connection request, designating a reserved channel when said reserve channel is stored in said second memory of said base station as a communication channel for at least said calling mobile station to establish a connection with said calling mobile station, and when all of the reserved channels stored in said second memory have already been assigned to communications of mobile stations so that no idle channel is available, said base station issuing a request for notification of an idle communication channel to the line controller so that the line controller can assign one of the idle communication channels that are kept track of by the line controller to said base station as a reserved channel.

11. A radio communication method according to claim 10, wherein said base station designates the reserve channel as a communication channel for said called mobile station as well to established a connection with said called mobile station.

12. A radio communication method according to claim 10, wherein said base station issues a connection notification related to unconnected and connected mobile stations to said line controller, and wherein said line controller is responsive to receipt of the connection notification which shows that unconnected mobile stations include a mobile station which is accommodated in a base station different from said base station to notify said different base station of a communication channel which is to be assigned to said different base station.

13. A radio communication method according to claim 10, wherein the request for the notification of an idle communication channel is issued when said base station is activated.

14. A radio communication method according to claim 10, wherein the request for the notification of an idle communication channel is issued when the reserve channels stored in said second memory have been assigned to communications of mobile stations so that no idle channels are available.

15. A radio communication method in a radio communications system which comprises at least one base station, a plurality of mobile stations accommodated in said base station, a line controller connected to said base station for keeping track of communication channels possessed by said radio communications system, and said line controller including a first memory for keeping track of each of the communication channels of said system for each base station as to whether the communication channel is occupied or idle, and said base station including a second memory for storing at least one of idle communication channels stored in said first memory as a reserved channel, said method comprising the steps of:

an arbitrary calling mobile station of said mobile stations issuing a connection request to said base station, said connection request including designation of at least one called mobile station with or without designation of a priority for connection;

said system being responsive to a connection request generated from an arbitrary calling mobile station of said mobile stations, said connection request including designation of at least one called mobile station without designation of a priority for connection, to designate a reserved channel stored in said second memory included in said base station as a communication channel for at least said calling mobile station to establish a connection with said calling mobile station;

when all of the reserved channels stored in said second memory have already been assigned to communications of mobile stations so that no idle channel is available, said system issuing a request for notification of an idle communications channel to the line controller so that the line controller can assign one of the idle communication channels that are kept track of by the line controller to said base station as a reserve channel; and said system responding to a connection request having designation of at least one called mobile station with designation of a high connection priority from an arbitrary calling mobile station to secure an idle communication channel from the communication channels possessed by said system to preferentially assigned the secured communication channel to a communication associated with said connection request.

16. A radio communication method according to claim 15, further comprising the step of:

in response to a connection request having a high connection priority issued from said calling mobile station, preferentially assigning a reserved channel stored in said second memory of said base station to the communication associated with said connection request.

17. A radio communication method according to claim 16, wherein the reserved channels stored in said second memory of said base station include an idle communication channel for a connection request having a high connection priority, and wherein said radio communication method further comprising the step of:

in response to a connection request issued from a calling mobile station and having a high connection priority, preferentially assigning the idle communication channel stored in said second memory of said base station for the connection request having a high connection priority to a communication associated with said connection request.

18. A radio communication system according to claim 15, further comprising the step of:

in response to a connection request having a high connection priority issued from a calling mobile station, aborting a communication through a communication channel being used and preferentially assigning the communication channel freed thereby to a communication associated with said connection request when no idle communication channel is currently available.

* * * * *